United States Patent [19]

Rose et al.

[11] Patent Number: 5,456,489

[45] Date of Patent: Oct. 10, 1995

[54] HYBRID INFLATOR ADAPTER AND SECONDARY RETAINER

[75] Inventors: Larry D. Rose, Layton; Donald R. Lauritzen, Hyrum; David J. Green, Brigham City, all of Utah

[73] Assignee: Morton International, Inc., Chicago, Ill.

[21] Appl. No.: 259,888

[22] Filed: Jun. 15, 1994

[51] Int. Cl.⁶ ............................................. B60R 21/16
[52] U.S. Cl. .................................. 280/728.2; 280/741
[58] Field of Search .......................... 280/728 A, 732, 280/743 A, 741

[56] References Cited

U.S. PATENT DOCUMENTS 5,356,175 10/1994 Rose et al. ........................... 280/741

Primary Examiner—Kenneth R. Rice
Attorney, Agent, or Firm—George W. Rauchfuss, Jr.; Gerald K. White

[57] ABSTRACT

An adapter and retainer secures a hybrid inflator within the reaction canister of a passenger-side airbag module. It attaches to, or is integral with, the end wall of the canister and includes a cup which receives the nozzle end of the inflator. Surrounding the cup is a gas-impermeable flange. The flange includes compressive force means for applying clamping force to the inflator parallel to its longitudinal axis while resisting pressure buildup from within the canister during inflator actuation.

12 Claims, 2 Drawing Sheets

HYBRID INFLATOR ADAPTER AND SECONDARY RETAINER

TECHNICAL FIELD

This invention relates to motor vehicle airbag modules. More specifically, it relates to the mounting of a hybrid inflator in the reaction canister of a passenger side airbag module.

BACKGROUND ART

A motor vehicle passenger side airbag module customarily comprises a trough-shaped reaction canister having spaced sidewalls, a floor, and a pair of end plates. An inflator is mounted in the bottom of the canister. The folded airbag is also housed within the canister above the inflator. A suitable cover which may form a portion of the dashboard is adjacent the open mouth of the canister and is designed to break open under the influence of the expanding airbag.

Some such passenger side modules employ hybrid inflators. A typical hybrid inflator is a cylindrical pressure vessel approximately 2.4" in diameter having a length of 5–15". The gas discharge ports are located at one end of the inflator. Because the gas is discharged very rapidly and from only one end, the flow parallel to the axis of the inflator causes high reaction canister pressure at the end plates. This high pressure makes the inflator to canister mounting difficult. It typically requires a welding operation to minimize gas leakage and guarantee inflator retention.

It is an object of the present invention to provide means for retaining a hybrid inflator within the reaction canister without the need for a welding operation. Other objects, features and advantages will become apparent from the following description and appended claims.

DISCLOSURE OF INVENTION

The invention comprises means for securing an inflator within a canister which includes a cup in circumferential press fit engagement with one end of the inflator and coaxial with its longitudinal axis. The cup includes a base which receives and holds the first end of the inflator. An annular mounting plate surrounds the cup and is integral with the end plate of the reaction canister. A flange surrounds the cup and extends from the cup to the mounting plate to provide a gas impervious connection therebetween. The flange includes at least one compressive force member which is resistant to gas pressure build-up within the canister. As a result, the inflator is compressively retained between the end plates of the canister and gas leakage from the canister is minimized.

BEST MODE FOR CARRYING OUT THE INVENTION

Figures 1, 2:
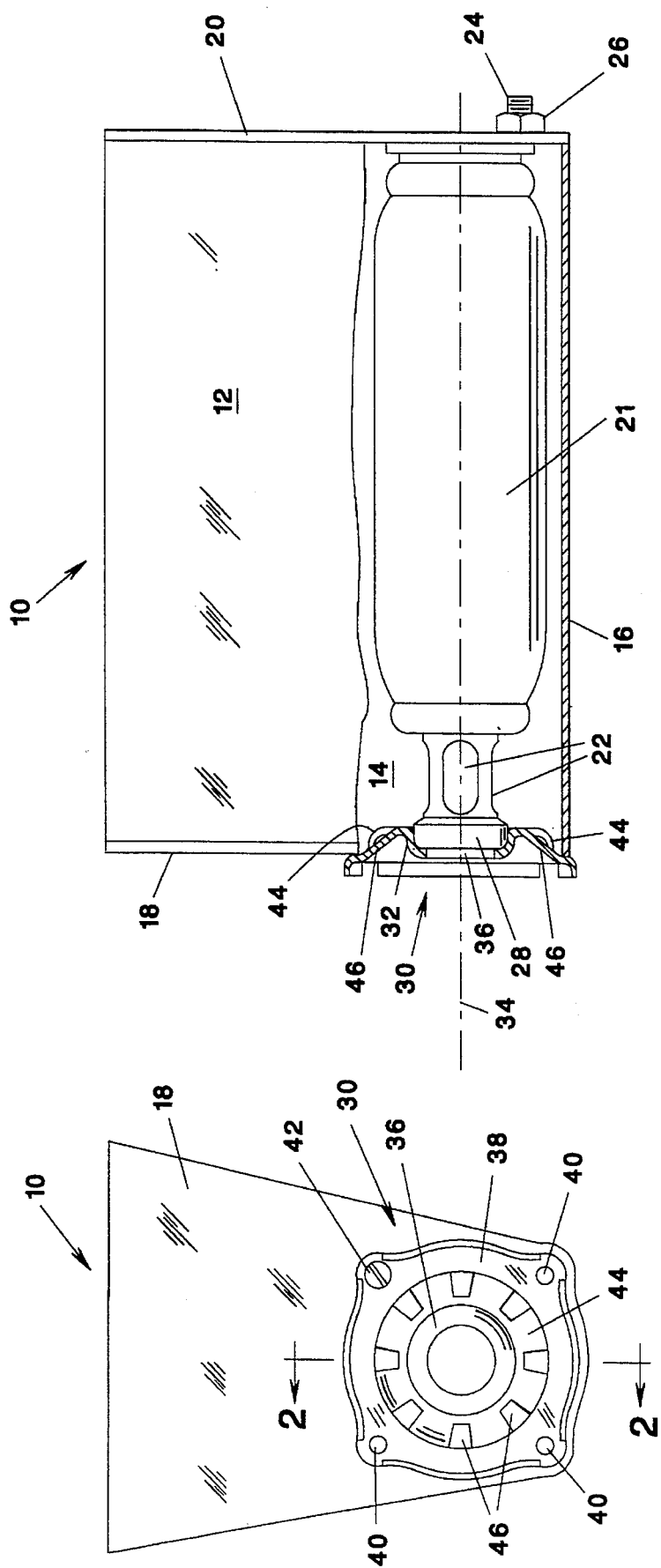
FIG. 1 is an end view of a reaction canister including the adapter of this invention.
FIG. 2 is a cross-section taken substantially along the line 2—2 of FIG. 1.

FIGS. 1 and 2 illustrate a reaction canister 10 having the customary sidewalls 12, 14, floor 16, and end walls in the form of plates 18, 20. Hybrid inflator 21 is mounted within the reaction canister 10 with its gas discharge openings 22 located at one end of the canister. An optional mounting stud 24 secures the base of the inflator 21 to the endplate 20 by means of a nut 26. The adapter and retainer of this invention engages the end of an inflator nozzle 28 and will now be described in detail.

The adapter/retainer 30 of this invention may be made of a material such as steel and comprises a cup 32 which is coaxial with the longitudinal axis 34 of the inflator 21 and is in circumferential press-fit engagement with the nozzle 28 end of the inflator. An annular base 36 extends inwardly from the wall of the cup 32 and engages the end face of the nozzle 28. An annular mounting plate 38 surrounds the cup 32 and includes mounting holes 40 by which it is secured to the end plate 18 by means of screws 42, only one of which is illustrated. In this fashion, the mounting plate 38 is made integral with the end plate 18 and, in fact, it may form a portion of the end plate itself. Extending between the cup 32 and the mounting plate 38 is a gas impervious flange 44. The flange 44 is characterized by a plurality of circumferentially spaced radial raised stiffening ribs 46 which function as compressive force members resistant to gas pressure buildup within the canister 10. The dimensions of the adapter/retainer 30 are such that, when the mounting plate 38 is snugly secured to the end plate 18, a substantial compressive force is applied by its base 36 to the end face of the nozzle 28 of the inflator. This serves to prevent any rattling of the inflator within the canister and also supplies a compressive counterforce against gas pressure buildup thus preventing leakage during inflator activation.

Figure 3:
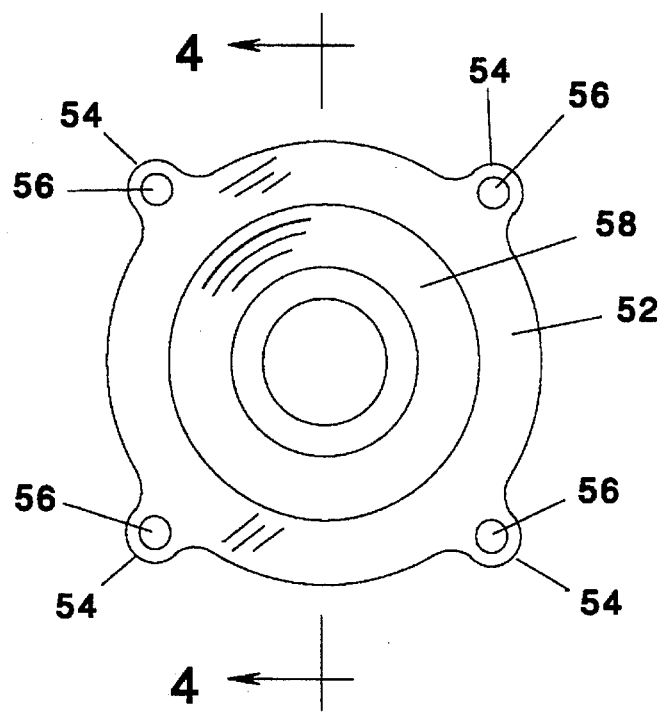
FIG. 3 is a front view of a modification of the invention.
Figure 4:
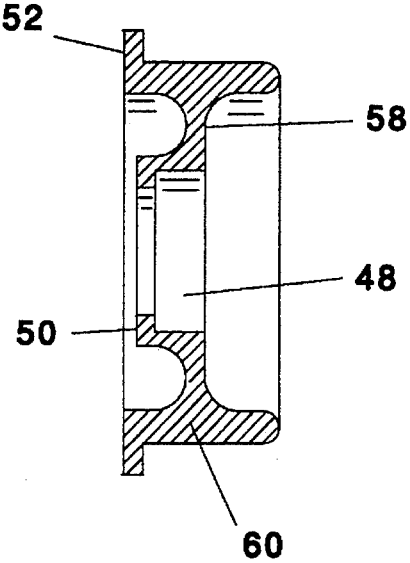
FIG. 4 is a cross-section taken substantially along the line 4—4 of FIG. 3.
Figure 5:
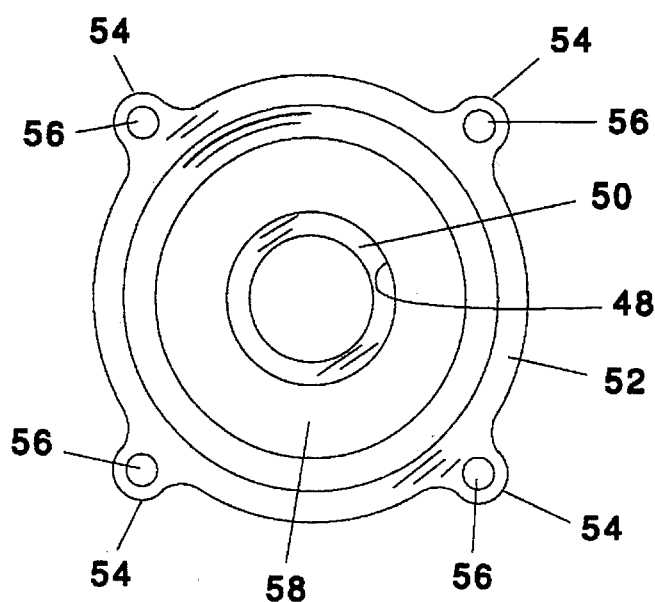
FIG. 5 is a rear view of the modification of FIG. 3.

FIGS. 3–5 illustrate an aluminum alternative to the steel construction just described. It is the functional equivalent and includes corresponding parts. Thus, it includes a cup 48 for engaging the nozzle 28 end of the inflator and a base 50 which abuts against the end face of the inflator nozzle. An annular mounting plate 52 is provided with lobes 54 containing mounting holes 56 by which the unit is secured to the end plate of a reaction canister by means of screws or bolts. A flange 58 provides a gas impervious connection between the cup 48 and the mounting plate 52. The compressive force member takes the form of a single thickened ring 60. As a result of the identity of elements between the FIG. 1 and FIG. 3 versions, the functions of the two modifications are virtually identical.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

We claim:

1. In an automotive airbag module including a trough-shaped reaction canister having first and second end walls; an elongated, substantially cylindrical, inflator having a longitudinal axis and extending from a first end positioned adjacent said first end wall to a second end engaging said second end wall and having a gas discharge outlet at one of said first and second ends; and means for securing the first end of said inflator to said first end wall, the improvement wherein said securing means comprises:

a cup in circumferential press-fit engagement with the first end of said inflator and coaxial with said longitudinal axis, said cup including a base receiving and holding the first end of the inflator;

a substantially annular mounting plate surrounding said cup and integral with said first end wall; and a flange surrounding the cup and extending from said cup to said mounting plate to provide gas-impervious connection therebetween, including at least one compressive force member resistant to gas pressure buildup within said canister, whereby said inflator is compressively retained between said end walls and gas leakage from said canister is minimized.

2. The improvement of claim 1 wherein said improvement includes fastening means for attaching said mounting plate to said first end wall.

3. The improvement of claim 1 wherein said compressive force member comprises a thickened ring formed in said flange and surrounding said longitudinal axis.

4. The improvement of claim 3 wherein said improvement includes fastening means for attaching said mounting plate to said first end wall.

5. The improvement of claim 1 wherein said gas discharge outlet is at the first end of said inflator.

6. The improvement of claim 5 wherein said improvement includes fastening means for attaching said mounting plate to said first end wall.

7. The improvement of claim 5 wherein said compressive force member comprises a thickened ring formed in said flange and surrounding said longitudinal axis.

8. The improvement of claim 7 wherein said improvement includes fastening means for attaching said mounting plate to said first end wall.

9. In an automotive airbag module including a trough-shaped reaction canister having first and second end walls; an elongated, substantially cylindrical, inflator having a longitudinal axis and extending from a first end positioned adjacent said first end wall to a second end engaging said second end wall and having a gas discharge outlet at one of said first and second ends; and means for securing the first end of said inflator to said first end wall, the improvement wherein said securing means comprises:

a cup in circumferential press-fit engagement with the first end of said inflator and coaxial with said longitudinal axis, said cup including a base receiving and holding the first end of the inflator;

a substantially annular mounting plate surrounding said cup and integral with said first end wall; and a flange surrounding the cup and extending from said cup to said mounting plate to provide gas-impervious connection therebetween, including a plurality of radially disposed ribs formed in said flange and surrounding said longitudinal axis as compressive force members resistant to gas pressure buildup within said canister, whereby said inflator is compressively retained between said end walls and gas leakage from said canister is minimized.

10. The improvement of claim 9 wherein said improvement includes fastening means for attaching said mounting plate to said first end wall.

11. The improvement of claim 9 wherein said gas discharge outlet is at the first end of said inflator.

12. The improvement of claim 11 wherein said improvement includes fastening means for attaching said mounting plate to said first end wall.

* * * * *